June 7, 1927.

E. F. POTTER 1,631,288

GROUND CLAMP CONNECTER

Filed June 7, 1923

Inventor.
Earl F. Potter.
By George E. Mueller Atty.

Patented June 7, 1927.

1,631,288

UNITED STATES PATENT OFFICE.

EARL F. POTTER, OF GLENCOE, ILLINOIS, ASSIGNOR OF ONE-HALF TO GEORGE W. RODORMER, OF PARK RIDGE, ILLINOIS.

GROUND-CLAMP CONNECTER.

Application filed June 7, 1923. Serial No. 643,892.

My invention relates to ground clamp connecters, and has to do more particularly with devices of this kind adapted to provide a ground connection to a pipe or rod and so arranged that an electrical conductor may be readily attached thereto.

An object of my invention is to provide a device of this character, simple of construction, cheap to manufacture, and readily installed. One of the features of my invention is a clamp which may be readily slipped over a pipe or rod from the side, after which a bridge plate is snapped across the clip and provided with a clamping screw for tightening the clip on the pipe, the construction being such that the connecter may be readily attached to the pipe and removed therefrom.

Another feature of my invention is the provision of a device of the above character having a series of locking elements, so that the same connecter may be used for embracing pipes or rods of various diameters and readily applied thereto from the side.

For a better understanding of my invention reference is to be had to the accompanying drawing, in which Fig. 1 is a perspective view of the form of my invention having a single locking element, and in which the connecter may be secured to pipes varying in diameters within the range of the length of the clamping screw;

Figure 1:
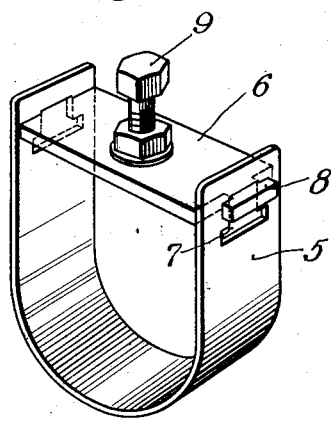
Figure 2:
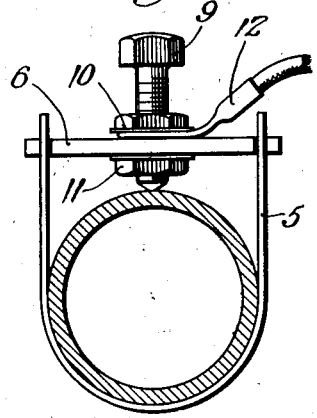
Fig. 2 is a side elevation of the connecter attached to a pipe.
Figure 3:
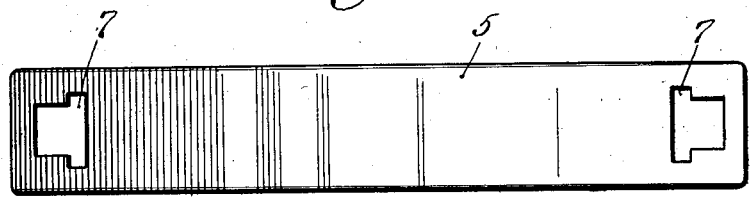
Fig. 3 is a plan view of the strap of the connecter of Figs. 1 and 2, before it is formed up to embrace the pipe.
Figure 4:
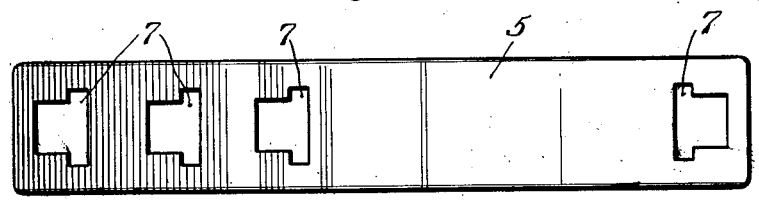
Fig. 4 shows the strap with a plurality of locking elements adapted for a wide range of sizes of pipes.

Referring now more in detail to the form of my invention as shown in Figs. 1 to 3, I provide a strap element 5, preferably of a flexible metal so that it may be readily bent round into a U-shape to be slipped over a pipe as indicated in Fig. 2. The construction is preferably such that the strap may be slipped over the pipe from the side, the advantage of this being that it is frequently necessary to secure a ground connection to a pipe inaccessible from its ends, so that the connecter must be slipped over the side of the pipe and not over the end. Any suitable metal may be employed for this purpose and I find soft steel, copper plated, or copper, very suitable for this purpose.

In order to secure the clip to the pipe I employ a bridge plate 6 adapted to lock across the legs of the clip, and to this end I provide cooperating holes and locks on the parts, preferably placing the holes 7 in the strap in the form of a T-shape so that the T heads 8 of the bridge plate may be inserted through the wide portion of the slot 7 and slip up into the narrow portion so as to lock against separation. The bridge plates 6 are preferably of metal and of a heavy enough metal to stand the strain of a clamping screw 9, which is threaded through the plate and has a pair of nuts 10—11 thereon, one of which acts as a lock nut for the screw and the other for clamping the end of the conductor 12 to the ground clamp.

The screw 9 is preferably of such a length that a strap 5 with a single set of locking elements 7 may be used on pipes or rods within a range of diameters which will not require too great a length of screw.

In applying the connecter to a pipe the strap 5, which may be carried in stock flat as shown in Fig. 3, is readily formed so as to embrace the pipe as shown in Fig. 2, and then the bridge plate 6 is snapped into place. The strap 5 is readily bendable so that it may be readily shaped or bent in or out to take and hold the plates 6. The screw 9 is then threaded through the plate 6 until the clip is tight enough around the pipe to maintain its position, the end of the screw 9 being pointed sufficiently so that it will enter or clean off the surface of the pipe sufficiently to provide a good contact. The lock nut 11 is then turned to lock the screw in the plate, after which the conductor which is to be attached to the ground clamp may be readily applied and held by the nut 10.

It will thus be seen that I have provided a simple, cheap but effective ground clamp connecter, which may be readily applied to a pipe or rod; one which will center itself and insure a direct pressure contact and maintain its position where placed. Also, it may be readily removed or changed when desired.

As already pointed out, another feature of my invention is that it may be constructed so as to be used on pipes of a great range of sizes by simply providing a plurality of locking holes 7, these holes being punched out along the strap and used according to the diameter of the pipe to which the connecter is to be applied.

For the purpose of illustration I have shown several forms of my invention, but I appreciate that changes and modifications will readily occur to those skilled in the art, and therefore I do not desire to be limited to the exact structures shown and described but aim to cover all that which comes within the spirit and scope of the appended claims.

What I claim as new and desire to secure by United States Letters Patent is:

1. A ground clamp connecter of the character described comprising a flexible metal strip formed into a U shape to embrace a pipe for an electrical connection, a bridge piece, said strip and bridge piece having interlocking T-heads and T-holes for removably securing the bridge piece to the strip across the open end so as to be laterally applicable to and removable from the pipe, and a clamping screw for securely holding the strip and bridge piece in electrical contact with the pipe embraced.

2. A ground clamp connecter of the character described comprising a flexible metal strip formed into a U shape to embrace a pipe for an electrical connection, a bridge piece having a T-shaped locking end, said strip having T-shaped locking holes for removably securing the bridge piece to the strip across the open end so as to be laterally applicable to and removable from the pipe, and a clamping screw carried by the bridge piece for tightening the clip around the pipe.

3. A ground clamp of the character described comprising a flexible metal strap formed into a U shape clip to embrace a pipe for an electrical connection and having holes through the ends of the legs, a bridge plate having T-shaped ends for locking insertion in said holes by springing the ends of the clip outwardly and then over the bridge plate ends to hold the parts together, and means for clamping the clip and plate upon the pipe.

4. A ground clamp connecter comprising a normally longitudinal flat flexible metal strap adapted to be shaped for embracing pipes of different diameters, and having a series of irregular shaped holding openings, and a stiff flat plate for bridging the strap having locking shaped heads cooperable with the proper opening depending upon the diameter of the pipe embraced, and arranged to permit adjustment of the strap towards the pipe, and clamping means for tightening the strap on the pipe.

In witness whereof, I hereunto subscribe my name this 10th day of May A. D., 1923.

EARL F. POTTER.